United States Patent
Nakajima et al.

(10) Patent No.: US 6,404,946 B1
(45) Date of Patent: Jun. 11, 2002

(54) ARRAYED WAVEGUIDE GRATING TYPE OPTICAL MULTIPLEXER/DEMULTIPLEXER

(75) Inventors: Takeshi Nakajima; Kanji Tanaka; Toshihiko Ohta; Shiro Nakamura, all of Ichihara (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/635,492

(22) Filed: Aug. 9, 2000

Related U.S. Application Data

(63) Continuation of application No. PCT/JP99/06634, filed on Nov. 29, 1999.

(30) Foreign Application Priority Data

Dec. 9, 1998 (JP) .......................................... 10-350442

(51) Int. Cl.$^7$ ................................................. G02B 6/28
(52) U.S. Cl. ......................................... 385/24; 385/37
(58) Field of Search ............................... 385/37, 43, 27

(56) References Cited

U.S. PATENT DOCUMENTS 5,412,744 A * 5/1995 Dragone ...................... 385/24
5,706,377 A   1/1998 Yuan .............................. 385/37
6,069,990 A * 5/2000 Okawa et al. ................ 57/319

FOREIGN PATENT DOCUMENTS

| JP | 2-244105  | 9/1990 |
| JP | 8-122557  | 5/1996 |
| JP | 10-73730  | 3/1998 |
| JP | 11-2733   | 1/1999 |
| JP | 11-160555 | 6/1999 |

* cited by examiner

Primary Examiner—Ellen E. Kim
(74) Attorney, Agent, or Firm—Oblon, Spivak, McClelland, Maier & Neustadt, P.C.

(57) ABSTRACT

An arrayed waveguide grating type optical multiplexer/demultiplexer including an arrayed waveguide grating having a plurality of channel waveguides. Concave end faces of input-side and output-side slab waveguides are connected to opposite ends of the diffraction grating. At least one input waveguide and at least one output waveguide are connected to the other concave end faces of the input-side and output-side slab waveguides, respectively. The focal length of the output-side slab waveguide end face is longer than the focal length of the input-side slab waveguide end face. The optical multiplexer/demultiplexer has a sufficiently flat wavelength-dependent spectrum response in passing channel spacings, and helps construct an optical wavelength multiple communication system having a good signal-to-noise ratio.

17 Claims, 5 Drawing Sheets

ARRAYED WAVEGUIDE GRATING TYPE OPTICAL MULTIPLEXER/DEMULTIPLEXER

This application is a continuation of prior application PCT/JP99/06634, filed on Nov. 29, 1999.

BACKGROUND OF THE INVENTION

1. Field of the Invention

The present invention relates to an optical multiplexer/demultiplexer for use in optical wavelength (optical frequency) multiplex communication, and more specifically to an arrayed waveguide grating type optical multiplexer/demultiplexer having a sufficiently flat wavelength-dependent spectrum response in passing channel spacings or wavelength bands.

2. Discussion of the Background

In recent years, in the field of optical communication, researches have eagerly researched on an optical wavelength multiplex communication system that achieves a large increase in transmission capacity. In the multiplex communication system, the available transmission wavelength range is divided into a plurality of passing channel spacings, and pieces of information carried by a plurality of lightwave signals of different wavelengths are transmitted through a single optical fiber. For that purpose, an optical multiplexer/demultiplexer for multiplexing lightwaves of different wavelengths (frequencies) and for demultiplexing the wavelength-multiplexed lightwave into lightwaves of the original wavelengths is used in the optical wavelength multiplex communication.

To increase transmission capacity, it is effective to divide the transmission wavelength region into many passing channel spacings, or in other words, to use many lightwaves having narrow channel spacings. The optical multiplexer/demultiplexer is required to be capable of multiplexing and demultiplexing lightwaves having a frequency interval of 100 GHz, for instance, which corresponds to a wavelength interval of about 0.8 nm in the 1.55 μm region.

In the optical wavelength multiplex communication, sometimes a relatively inexpensive LD light source is used to reduce the costs of constructing the communication system. However, the oscillating wavelength in the LD light source can deviate from the designed wavelength due to variations in ambient conditions, such as temperature and humidity, and can vary with time. Therefore, when an LD light source is used, the wavelength of lightwave to be multiplexed or demultiplexed can vary. On the other hand, the spectrum response of the optical multiplexer/demultiplexer in a passing wavelength band (channel spacing) is wavelength-dependent (spectrum response will be hereinafter referred to also as wavelength-dependent spectrum response).

Therefore, when the oscillating wavelength of the light source varies as mentioned above, the loss of the light passing through the optical multiplexer/demultiplexer varies depending on the spectrum response of the optical multiplexer/demultiplexer by the amount corresponding to the variation of the oscillating wavelength of the light source. Such variation of loss makes the loss of multiplexed/demultiplexed light ununiform between lightwaves having different wavelengths. This ununiformity causes a deterioration in a signal-to-noise ratio in the transmission of pieces of information carried by lightwave signals. The less flat the wavelength-dependent spectrum response of the optical multiplexer/demultiplexer is, the more ununiform the loss becomes.

As described above, the optical multiplexer/demultiplexer for use in an optical wavelength multiplex communication system is not only required to be able to multiplex and demultiplex many lightwaves of narrow channel spacings, but is also required to have a sufficiently flat wavelength-dependent spectrum response in passing channel spacings in the wavelength range used for the multiplex communication.

To meet the first requirement of multiplexing and demultiplexing lightwaves of narrow channel spacings, an optical multiplexer/demultiplexer using an arrayed waveguide grating has been proposed.

An arrayed wavelength grating type optical multiplexer/demultiplexer shown as an example in FIG. 8 has a plurality of input waveguides 2 formed on a substrate 1. The input waveguides 2 are connected to an end face 3a of an input-side slab waveguide 3 having the other end face 3b thereof connected to ends of one-side of a plurality of channel waveguides 4a that constitute an arrayed waveguide grating 4. The other ends of the channel waveguides 4a are connected to an end face 5a of an output-side slab waveguide 5 having the other end face 5b thereof connected to a plurality of output waveguides 6.

The input-side slab waveguide 3 has opposite end faces 3a, 3b. The end face 3b is formed to be a concave face that has a center of curvature positioned at the center of the other end face 3a. The end face 3a is formed to be a concave face having a center of curvature positioned at the middle point of a line connecting the centers of the end faces 3a, 3b. Similarly, the end face 5a of the output-side slab waveguide 5 is formed to be a concave face whose center of curvature is positioned at the center of the other end face 5b. The end face 5b is formed to be a concave face having a center of curvature positioned at the middle point of a line connecting the centers of the end faces 5a, 5b.

As for the demultiplexer function of the optical multiplexer/demultiplexer, typically wavelength-multiplexed light is introduced through an input waveguide 2 connected to a central portion of, preferably, the center of the end face 3a of the input side-slab waveguide 3. From the input waveguide 2, the wavelength-multiplexed light is incident on the end face 3a of the input-side slab waveguide 3, and diffracted in the slab waveguide 3. Then, through the channel waveguides 4a that have different waveguide lengths, the light is incident on the end face 5a of the output-side slab waveguide 5, undergoes interference in the slab waveguide 5, and focuses on the other end face 5b of the slab waveguide 5. Focusing positions are different according to wavelengths. For example, lightwaves each having a central wavelength in a corresponding one of the passing channel spacings for the optical multiplexer/demultiplexer, focus on their respective focusing positions on the slab waveguide end face 5b and are taken out through the output waveguides 6 connected to those focusing positions, respectively. As for the multiplexer function, signal light beams entering the input waveguides 2 or the output waveguides 6 and having different wavelengths are multiplexed, and the multiplexed signal light is taken out from the input waveguide 2 or the output waveguide 6 connected to the center of the input or output side slab waveguide end face 3a or 5b.

In the optical multiplexer/demultiplexer described above, the angular dispersion on the end face 5b of the output-side slab waveguide 5 is expressed as follows:

$$d\theta/d\lambda = m/(n_s \cdot d) \tag{1}$$

In equation (1), θ denotes the angle of diffraction, m is the order of diffraction, λ is the wavelength of an input lightwave, ns is the refractive index of the slab waveguides 3 and 5, and d is the pitch between the channel waveguides 4a.

When the focal length of the output-side slab waveguide 5 is denoted by F1, and the position on the slab waveguide end face 5b as viewed in the direction of the width of the slab waveguide 5 (typically, the distance from the center of the slab waveguide end face 5b to the focusing position) is denoted by x1, the linear dispersion on the end face 5b is expressed as follows:

$$dx1/d\lambda = (m \cdot F1)/(ns \cdot d) \quad (2)$$

As mentioned above, since the input-side slab waveguide 3 and the output-side slab waveguide 5 have the same focal length F1, the linear dispersion on the end face 3a of the input-side slab waveguide 3 is the same as the linear dispersion on the end face 5b of the output-side slab waveguide 5 expressed by equation (2).

Therefore, the electric field distribution of the light that focuses on the focusing position on the end face 5b (places at which the slab waveguide end face 5b and the output waveguides 6 are connected) corresponds to the electric field distribution of the input light incident on the input-side slab waveguide 3 from the input waveguide 2.

Generally, the broadening of the electric field distribution of the input light is relatively narrow. Therefore, in the conventional arrayed waveguide grating type optical multiplexer/demultiplexer, the broadening of the electric field distribution of the light, which focuses on the focusing position on the end face 5b of the output-side slab waveguide 5 and is taken out through the output waveguides 6 corresponding to those focusing positions, is relatively narrow. On the other hand, the broadening of the electric field distribution of the light observed at the focusing position closely relates to the flatness of the wavelength-dependent spectrum response in the passing wavelength band or channel spacing.

As mentioned above, the less flat the wavelength-dependent spectrum response of the optical multiplexer/demultiplexer is, the more ununiform, depending on wavelength, the passing loss of the light that passes through the optical multiplexer/demultiplexer becomes. Therefore, in the communication system using the conventional arrayed waveguide grating type optical multiplexer/demultiplexer that has insufficient flatness in a wavelength-dependent spectrum response, when light having a deviated central wavelength caused by the variation of the oscillating wavelength of the light source or the like passes through the multiplexer/demultiplexer, the loss of light becomes ununiform, which causes deterioration in the signal-to-noise ratio.

SUMMARY OF THE INVENTION

Accordingly, one object of the present invention is to provide an arrayed waveguide grating type optical multiplexer/demultiplexer having a desirable wavelength-dependent spectrum response in passing channel spacings.

To achieve the above and other objects, the present invention provides an arrayed waveguide grating type optical multiplexer/demultiplexer in which a diffraction grating side end face of an input-side slab waveguide and a diffraction grating side end face of an output-side slab waveguide are connected by an arrayed waveguide grating including of a plurality of channel waveguides. In addition, at least one input waveguide is connected to a waveguide end face of the input-side slab waveguide, and at least one output waveguide is connected to a waveguide end face of the output-side slab waveguide. The optical multiplexer/demultiplexer also has a focal length of the diffraction grating end face of the output-side slab waveguide which is longer than a focal length of the waveguide end face of the input-side slab waveguide.

The optical multiplexer/demultiplexer of the present invention, which includes an arrayed waveguide grating capable of multiplexing lightwaves of narrow channel spacings and demultiplexing a wavelength-multiplexed lightwave made of such lightwaves, is suited to multiplex and demultiplex lightwave signals in an optical wavelength (optical frequency) multiplex communication system using, for signal transmission, the transmission wavelength region divided into a plurality of passing channel spacings. Specifically, since the focal length of the output-side slab waveguide end face is longer than the focal length of the input-side slab waveguide end face, the broadening of the electric field distribution of the light observed on the output-side slab waveguide end face is broader than the broadening of the electric field distribution of the light on the input-side slab waveguide end face. This improves the flatness of the wavelength-dependent spectrum response in each passing channel spacing for the optical multiplex communication. In the optical communication system, when the light whose central wavelength is deviated due to variation of the oscillating wavelength of a light source or the like passes through an optical multiplexer/demultiplexer, the loss of light can be varied by the deviation of wavelength. The variation of the loss of light can cause a deterioration in a signal-to-noise ratio in the communication system. On the other hand, according to the optical multiplexer/demultiplexer of the present invention having a sufficiently flat wavelength-dependent spectrum response, the wavelength-dependency of the loss of the light passing through the multiplexer/demultiplexer is reduced as long as the deviated central wavelength falls within a region where the wavelength-dependent spectrum response is flat. Thus, the variation of the loss of light is reduced, and the deterioration in signal-to-noise ratio is reduced.

More specifically, in the optical wavelength multiplex communication, it is desirable that the loss of the light passing through an optical multiplexer/demultiplexer and observed at a wavelength falling within a channel spacing is not larger than that observed at the central wavelength of the channel spacing, for example, by 1 dB or more. In other words, it is desirable for the optical multiplexer/demultiplexer to have a broad 1 dB passing band width (1 dB channel spacing width). The present invention provides an optical multiplexer/demultiplexer that meets such a requirement, and therefore is of significant help in constructing an optical wavelength multiplex communication system.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
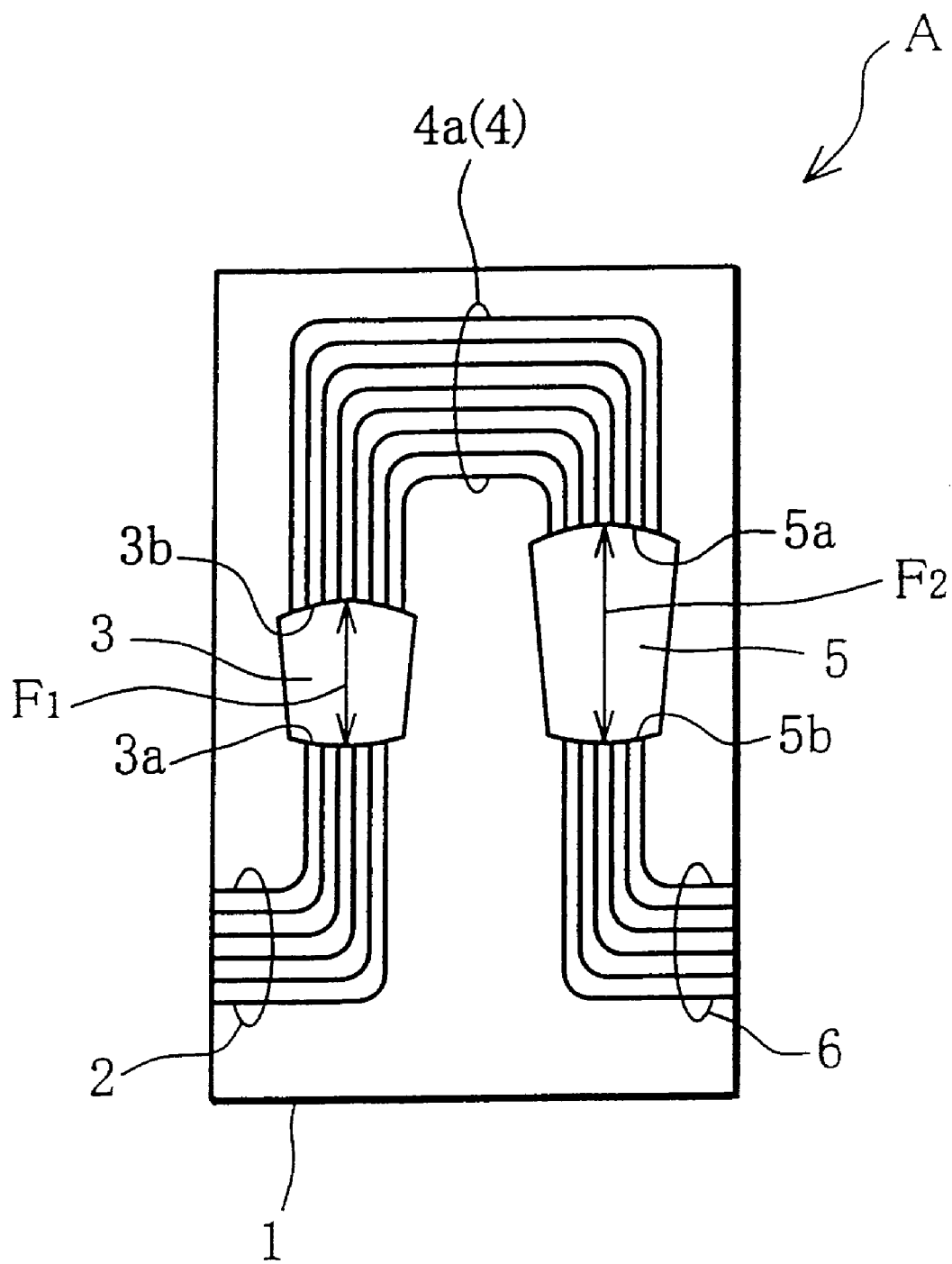
FIG. 1 is a schematic of an optical multiplexer/demultiplexer according the present invention.

Referring now to the drawings, wherein like reference numerals designate identical or corresponding parts throughout the several view, FIG. 1 illustrates an arrayed waveguide grating type optical multiplexer/demultiplexer A according to the present invention.

Figure 8:
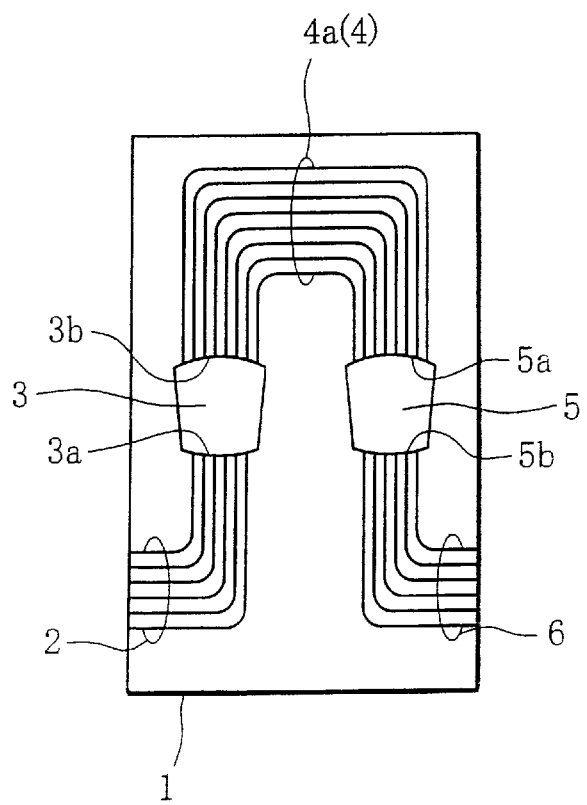
FIG. 8 is a schematic of a background arrayed waveguide grating type optical multiplexer/demultiplexer.

The optical multiplexer/demultiplexer A has a similar structure as the background optical multiplexer/demultiplexer shown in FIG. 8. That is, the optical multiplexer/demultiplexer A includes input waveguides 2, an input-side slab waveguide 3, an arrayed waveguide grating 4, an output-side slab waveguide 5 and output waveguides 6 formed on a substrate 1. The diffraction grating 4 includes a plurality of channel waveguides 4a of different waveguide lengths. The components 2 to 6 of the optical multiplexer/demultiplexer A are connected in the same manner as in the optical multiplexer/demultiplexer of FIG. 8. The substrate 1 is, for example, an Si substrate or a glass substrate. The input waveguides 2, output waveguides 6, input-side slab waveguide 3, output-side slab waveguide 5 and arrayed waveguide grating 4 are formed, for example, of silica glass into their predetermined shapes, and embedded in a cladding material having a refractive index lower than silica glass.

In the optical multiplexer/demultiplexer A, an end face $3b$ of the input-side slab waveguide 3 is formed to be a concave face whose center of curvature is positioned at the center of the other end face $3a$. The end face $3a$ is formed to be a concave face having a center of curvature positioned at the middle point of a line connecting the centers of the end faces $3a$, $3b$. In a desirable mode shown in FIG. 1, the focal length of the input-side slab waveguide end face $3b$ is determined to be, for example, a value F1 (which is equal to the focal length of the end faces of the input-side and output-side slab waveguides of the conventional optical multiplexer/demultiplexer shown in FIG. 8). An end face $5a$ of the output-side slab waveguide 5 is formed to be a concave face having a center of curvature positioned at the center of the other end face $5b$, and the end face $5b$ is formed to be a concave face that has a center of curvature at the middle point of a line connecting the centers of the end faces $5a$, $5b$. Unlike the optical multiplexer/demultiplexer of FIG. 8, the focal length of the end face $5a$ of the output-side slab waveguide 5 is determined to be a value F2 that is larger than the value F1 (the focal length of the end face $3b$ of the input-side slab waveguide 3).

As is clear from the reciprocity of the present optical circuit, the optical multiplexer/demultiplexer A has a multiplexer function of multiplexing a plurality of signal lightwaves of different wavelengths introduced through a plurality of input waveguides 2 and taking out a wavelength multiplexed lightwave through a single output waveguide 6 connected to a central portion (preferably the center of the end face $5b$ of the output-side slab waveguide 5), and also has a demultiplexer function of demultiplexing a wavelength-multiplexed lightwave introduced through a single output waveguide 6 and taking out a plurality of signal lightwaves through a plurality of input waveguides 2. In the following description, the multiplexer function of the optical multiplexer/demultiplexer A will primarily be explained.

In the optical multiplexer/demultiplexer A, provided that the position on the slab waveguide end face $5b$ as viewed in the direction of the width of the output-side slab waveguide 5 is denoted by x2, the linear dispersion on the slab waveguide end face $5b$ is expressed as follows:

$$dx2/d\lambda = (m \cdot F2)/(ns \cdot d) \qquad (3)$$

In equation (3), m denotes the order of diffraction, $\lambda$ is the wavelength of an input lightwave, ns is the refractive index of the slab waveguides 3 and 5, and d is the pitch between the channel waveguides $4a$.

In the background optical multiplexer/demultiplexer shown in FIG. 8, the focal lengths of the end faces of the input-side and output-side slab waveguides are determined to be a same value F1. As already discussed, provided the position on the slab waveguide end face $5b$ in the direction of the width of the output-side slab waveguide 5 is denoted by x1, the linear dispersion on the slab waveguide end face $5b$ of the background optical multiplexer/demultiplexer is expressed by the following equation (2).

$$dx1/d\lambda = (m \cdot F1)/(ns \cdot d) \qquad (2)$$

Therefore, the following relationship is found between the linear dispersion on the output-side slab waveguide end face $5b$ of the optical multiplexer/demultiplexer A of the present invention and the conventional optical multiplexer/demultiplexer of FIG. 8.

$$(dx1/d\lambda):(dx2/d\lambda) = F1:F2 \qquad (4)$$

Since F1<F2, the linear dispersion $dx2/d\lambda$ in the optical multiplexer/demultiplexer A of the present invention is larger than the linear dispersion $dx1/d\lambda$ in the conventional optical multiplexer/demultiplexer of FIG. 8.

The linear dispersion $dx1/\lambda$, $dx2/d\lambda$ given by equations (2) and (3) represents focusing wavelength density on the end face (focal plane) $5b$ of the output-side slab waveguide 5. Therefore, when the linear dispersion is large, the focusing wavelength density on the slab waveguide end face $5b$ as viewed in the direction of the width of the output-side slab waveguide 5 is low, and the electric field distribution of the light focusing on the slab waveguide end face $5b$ is broad.

Accordingly, in the optical multiplexer/demultiplexer A, the broadening of the electric field distribution of the light that focuses on the focusing positions on the end face $5b$ is larger than the broadening of the electric field distribution of the light observed just before the light enters the input-side slab waveguide 3 from the input waveguides 2. This improves the flatness of the wavelength dependent spectrum response of the optical multiplexer/demultiplexer A in each passing channel spacing.

To verify the above concept, a simulation was performed with the optical multiplexer/demultiplexer A of the present invention shown in FIG. 1 and the background optical multiplexer/demultiplexer shown in FIG. 8 using a beam propagation method.

Figure 2:
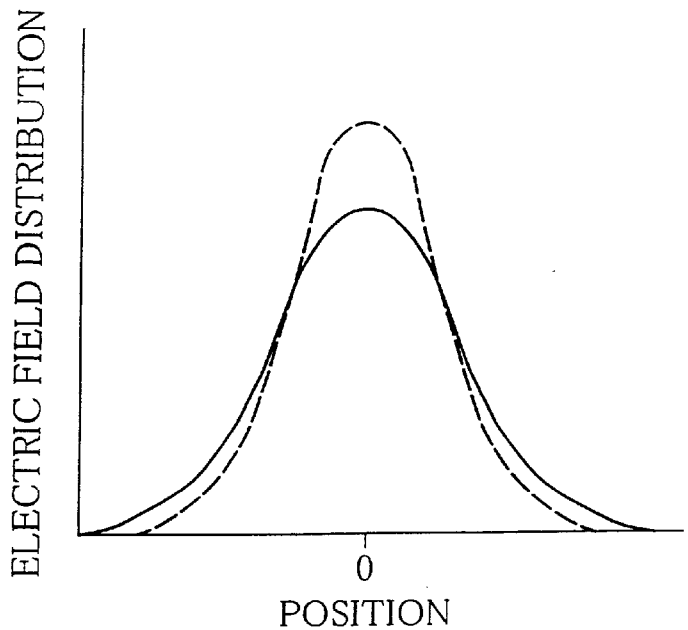
FIG. 2 is a graph showing the result of a simulation concerning the electric field distribution of light focusing on a focal plane of an output-side slab waveguide in the optical multiplexer/demultiplexer of FIG. 1.

FIG. 2 shows the electric field distribution of the light focusing on the end face 5b of the output-side slab waveguide 5 in the optical multiplexer/demultiplexer A and in the conventional optical multiplexer/demultiplexer each obtained by the simulation. In FIG. 2, the electric field distribution in the optical multiplexer/demultiplexer A of the present invention is shown with a solid line, and the background optical multiplexer/demultiplexer is shown with a broken line.

As is apparent from FIG. 2, the electric field distribution of the light on the slab waveguide end face 5b in the optical multiplexer/demultiplexer A of the present invention is more extended or broader in the direction of the width of the slab waveguide (the x2 direction) than the background optical multiplexer/demultiplexer.

Figure 3:
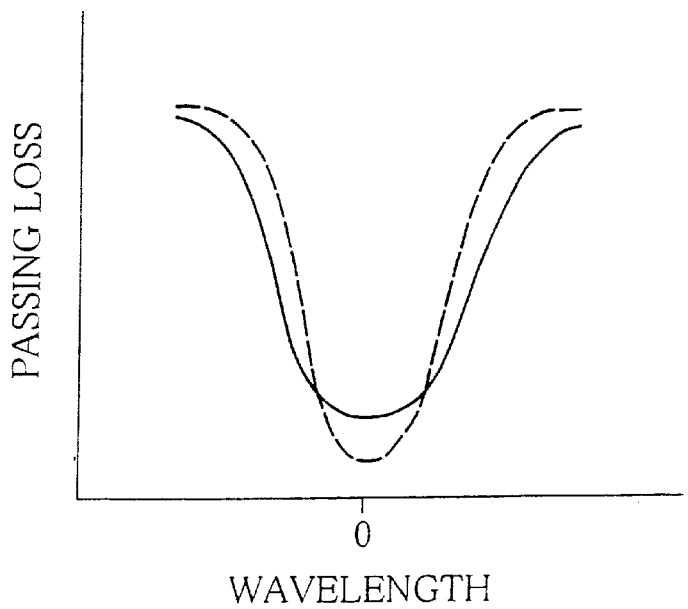
FIG. 3 is a graph showing the spectrum response of the optical multiplexer/demultiplexer of FIG. 1.

FIG. 3 shows the wavelength-dependent spectrum response of the optical multiplexer/demultiplexer A of the present invention and the background optical multiplexer/demultiplexer each obtained by the simulation. In FIG. 3, the wavelength dependent spectrum response of the optical multiplexer/demultiplexer A of the present invention is shown with a solid line, and the background optical multiplexer/demultiplexer is shown with a broken line.

As is apparent from FIG. 3, the wavelength-dependency of the passing loss of the optical multiplexer/demultiplexer A of the present invention is reduced compared to the background optical multiplexer/demultiplexer. In other words, in the optical multiplexer/demultiplexer A of the present invention, the flatness of the wavelength-dependent spectrum response is improved.

Next, with reference to FIGS. 4 and 5, a desirable mode of a connecting structure for connecting the input waveguide 2 and the end face 3a of the input-side slab waveguide 3 and a desirable mode of a connecting structure for connecting the end face 5b of the output-side slab waveguide 5 and the output waveguide 6 in the optical multiplexer/demultiplexer A of the present invention will be described. With these connecting structures, the flatness of the spectrum response of the optical multiplexer/demultiplexer is improved.

Figure 4:
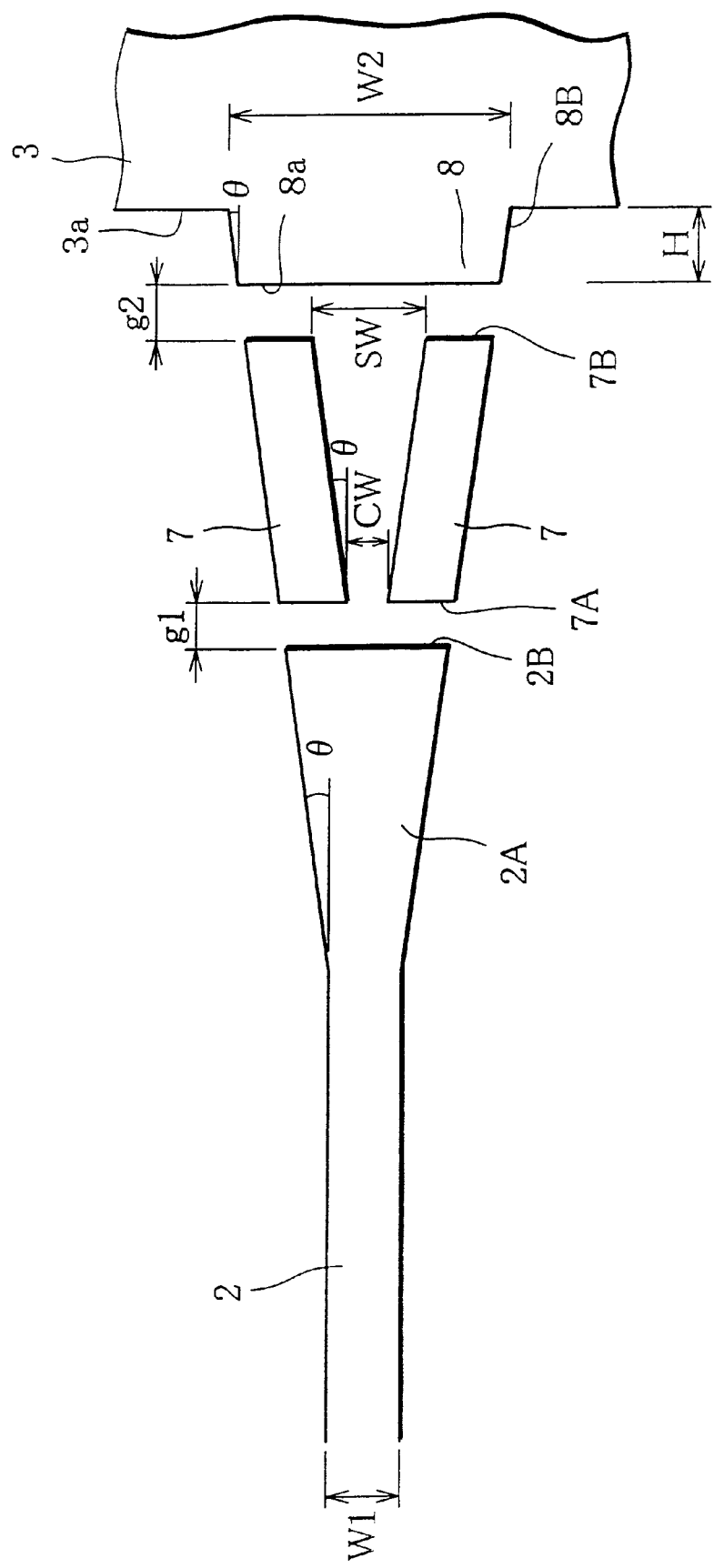
FIG. 4 is a schematic of a connecting structure for connecting an input waveguide and an input-side slab waveguide in the optical multiplexer/demultiplexer of FIG. 1.

In FIG. 4, an input waveguide 2 is connected to an input-side slab waveguide 3 via left and right narrow width waveguides 7 and a wide-width waveguide portion 8. The left and right faces of an end portion of the input waveguide 2 each obliquely extend outward as viewed in the direction of the width of the input waveguide 2 at an angle relative to the optical axis (longitudinal axis) of the input waveguide 2. Thus, the end portion of the input waveguide 2 has its width gradually increasing toward its end, that is, it is formed into an inverted tapered shape. In FIG. 4, the reference W1 denotes the width of the remaining portion of the input waveguide 2, and the reference 2B denotes the end face of the input waveguide 2, which extends perpendicularly to the optical axis of the input waveguide 2.

The left and right narrow-width waveguides 7 are arranged apart from the input waveguide 2 by a distance g1 in the direction of the optical axis of the input waveguide 2, and apart from each other in the direction of the width of the input-side slab waveguide 3. The narrow-width waveguides 7 each obliquely extend relative to the optical axis of the input waveguide 2 at the same angle as the tapering angle θ of the inverted tapered end portion of the input waveguide 2. The opposite end faces 7A, 7B of each narrow-width waveguide 7 are parallel to the end face 2B of the input waveguide 2. In FIG. 4, the references CW and SW denote distances between the two narrow-width waveguides 7 on the end face 7A side and the end face 7B side, respectively.

The input-side slab waveguide 3 is arranged with its optical axis (longitudinal axis) aligned with the optical axis of the input waveguide 2, and a wide-width waveguide portion 8 is connected to the input-side slab waveguide 3 on its input waveguide side. The wide-width waveguide portion 8 is arranged to face the narrow-width waveguides 7 with a distance g2 therebetween. In a plane view, the wide-width waveguide 8 is a trapezoidal shape whose length and width are H and W2, respectively. The left and right faces 8B of the wide-width waveguide portion 8 each obliquely extend relative to the optical axis of the input waveguide 2 and slab waveguide 3 at the same angle as the tapering angle θ of the inverted tapered end portion of the input waveguide 2. Thus, the left face of the input waveguide 2, the outside face of the left narrow-width waveguide 7, and the left face of the wide-width waveguide portion 8 are on the same plane. In addition, the right face of the input waveguide 2, the outside face of the right narrow-width waveguide 7, and the right face of the wide-width waveguide portion 8 are on the same plane.

In the optical multiplexer/demultiplexer A having the input waveguide 2 and the input-side slate waveguide 3 connected as shown in FIG. 4, light propagates through the input waveguide 2 and then enters a gap g1 from the end face 2B of the input waveguide 2. In the gap g1, since the light is released from confinement in the direction perpendicular to the optical axis of the input waveguide 2, the light is diffracted. The diffracted light enters the left and right narrow-width waveguides 7 from the gap g1 and propagates through the narrow-width waveguides 7. The electric field distribution of the light, observed just after the light passes through the left and right narrow-width waveguides 7, is of a bimodal shape having a deep depression at the central part of the distribution as viewed in the direction perpendicular to the optical axis of the input waveguide 2. The light having an electric field distribution of such a bimodal shape enters a gap g2 from the narrow-width waveguides 7. In the gap g2, since the light is released from confinement in the direction perpendicular to the optical axis of the input waveguide 2 and slab waveguide 3, the light is diffracted. The electric field distribution of the light, observed just before the light enters the wide-width waveguide portion 8 of the input-side slab waveguide 3 is of a bimodal shape, but the depression at its central part is a little less than the electric field distribution observed just after the light passes through the left and right narrow-width waveguides 7.

The light having such an electric field distribution then enters the wide-width waveguide portion 8 of the input-side slab waveguide 3. The wide-width waveguide portion 8 is made of a high refractive index layer. Therefore, as the light propagates through the wide-width waveguide portion 8, the depression observed at the center part of the bimodal electric field distribution of the light further decreases. In other words, in the electric field distribution of the light observed just before the light enters the input-side slab waveguide 3 from the wide-width waveguide portion 8, the difference between the minimum and maximum values decreases. Thus, with the connecting structure shown in FIG. 4, the broadening of the electric field distribution of the light observed just before the light enters the input-side slab waveguide 3 can be made larger.

The light having such an electric field distribution then propagates through the input-side slab waveguide 3, the arrayed waveguide grating 4 and the output-side slab waveguide 5 and focuses on the slab waveguide end face 5b.

As already mentioned, in the optical multiplexer/demultiplexer A in which the focal length F2 of the end face 5a of the output-side slab waveguide 5 is longer than the focal length F1 of the end face 3a of the input-side slab waveguide 3, the broadening of the electric field distribution of the light focusing on the slab waveguide end face 5b is larger than the distribution observed just before the light enters the input-side slab waveguide 3.

Specifically, the broadening of the electric field distribution of the light is extended by virtue of the connecting structure shown in FIG. 4 before the light enters the input-side slab waveguide 3, and it is further extended by the output-side slab waveguide 5. As a result, the broadening of the electric field distribution of the light focusing on the output-side slab waveguide end face 5b is larger. In other words, in the optical multiplexer/demultiplexer A having the connecting structure shown in FIG. 4, the flatness of the wavelength dependent spectrum response in a passing channel spacing is improved. Therefore, by connecting a plurality of input waveguides 2 to the input-side slab waveguide 3 as shown in FIG. 4, the flatness of the spectrum response in passing channel spacings can be improved.

Figure 5:
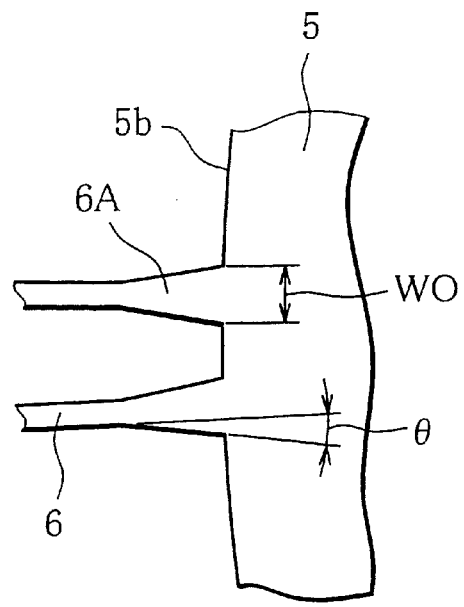
FIG. 5 is a schematic of a connecting structure for connecting an output waveguide and an output-side slab waveguide in the optical multiplexer/demultiplexer of FIG. 1.

In a connecting structure shown in FIG. 5, an output waveguide 6 has a relatively wide width W0 at its portion connected to a slab waveguide end face 5b. The slab waveguide end portion of the output waveguide 6 is formed into a tapered shape whose left and right faces each obliquely extend inward relative to the optical axis at an angle θ as viewed in the direction of the path width. With this structure, the light having a broad electric field distribution can be introduced from the slab waveguide end face 5b to the output waveguide 6. This helps improve the flatness of the wavelength-dependent spectrum response of the optical multiplexer/demultiplexer A.

EXAMPLE 1

Using a technique that is a combination of flame deposition, photolithography and etching, an optical multiplexer/demultiplexer having the structure shown in FIG. 1 was manufactured. The multiplexer/demultiplexer was adapted to multiplex a plurality of signal lightwaves having a frequency interval of 100 GHz (i.e., a wavelength interval of about 0.8 nm in the 1.55 μm wavelength region) and demultiplex a wavelength-multiplexed lightwave made of such signal lightwaves.

Specifically, by flame hydrosys deposition, a lower cladding layer (including $SiO_2$ as a main ingredient) and a core layer (including $SiO_2$ as a main ingredient and Ti as a dopant) were formed on an Si substrate in this order. The resultant form was then converted into a transparent glass by heating. Then, using photo masks, the core layer was dry-etched, and an upper cladding layer (including $SiO_2$ as a main ingredient) was formed by flame hydrosys deposition so the dry-etched core layer was buried under it. The upper cladding layer was then converted into a transparent glass by heating. Thus, an optical multiplexer/demultiplexer having the following specifications was manufactured.

1) Input waveguide, output waveguide: The width of the core was 6.5 μm, and the height of the core was 6.5 μm. The number of multiplex channels was 16.
2) Arrayed waveguide grating: The pitch between the channel waveguides was 15 μm, and the number of the channel waveguides was 100. The difference in optical path length (ΔL) was 66.3 μm. The order (m) of diffraction was 61. The FSR (Free Spectral Range) was 25 nm.
3) The focal length (F1) of the input-side slab waveguide was 8932 μm, and the focal length (F2) of the output-side slab waveguide was 17864 μm. Therefore, F1:F2= 1:2.

Light in the 1.55 μm band was introduced from a specified input waveguide of the optical multiplexer/demultiplexer A, and the wavelength characteristic of light emitted from the output waveguides was checked. The result is shown by a solid line in FIG. 6.

For comparison, a background optical multiplexer/demultiplexer was manufactured with the same specifications as the optical multiplexer/demultiplexer A, except each of the focal lengths of the input-side and output-side slab waveguides was 8932 μm. In this background optical multiplexer/demultiplexer, the wavelength characteristic of the light emitted from the output waveguides was checked in the same manner as in the first example of the present invention. The result is shown with a broken line in FIG. 6.

Figure 6:
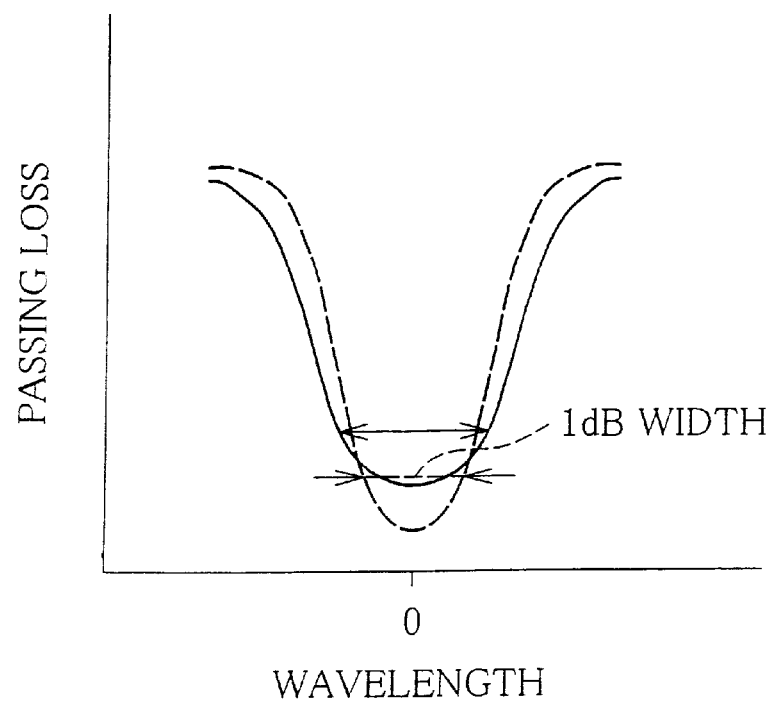
FIG. 6 is a graph showing the spectrum response of a first example of an optical multiplexer/demultiplexer according to the present invention.

As apparent from FIG. 6, the 1 dB passing wavelength bandwidth (1 dB channel spacing width) in the multiplexer/demultiplexer of the first example is 0.44 nm, while that in the too conventional multiplexer/demultiplexer is 0.24 mn. Thus, the former is much larger than the latter.

EXAMPLE 2

An optical multiplexer/demultiplexer according to a second example was manufactured using the connecting structure for connecting the input waveguide 2 and the input-side slate waveguide 3 as shown in FIG. 4 and the connecting structure for connecting the output-side slab waveguide 5 and the output waveguide 6 as shown in FIG. 5 with the following specifications.

Specifications of the input side: W1=6.5 μm, W2=15.0 μm, H=30 μm, θ=0.4°, CW=3.0 μm, SW=4.0 μm, g1=g2=5.0 μm Specifications of the output side: WO=13.5 μm, θ=0.4°

Figure 7:
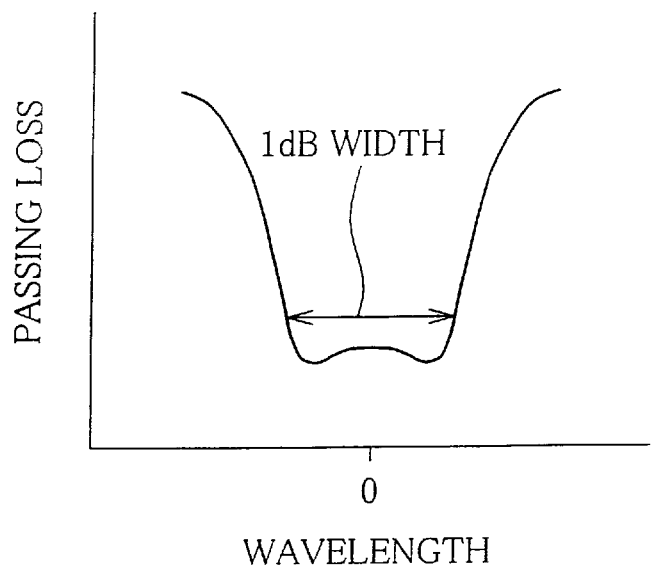
FIG. 7 is a graph showing the spectrum response of a second example of an optical multiplexer/demultiplexer according to the present invention.

The wavelength characteristic of the emitted light in the optical multiplexer/demultiplexer was checked in the same manner as in the first example. The result is shown in FIG. 7.

The width of the 1 dB passing wavelength band is 0.65 nm, which is much larger than that in the background optical multiplexer/demultiplexer mentioned above.

The present invention is not restricted to the desirable modes and Examples 1 and 2 described above. That is, it can be modified in various manners. For example, the optical multiplexer/demultiplexer A has in the desirable mode described above a plurality of input waveguides 2 and a plurality of output waveguides 6. However, it may have a single input waveguide 2 and a plurality of output waveguides 6. In that case, a wavelength-multiplexed lightwave is introduced through the single input waveguide 2 and separated into a plurality of signal light waves, and those signal light waves are taken out from the corresponding output waveguides 6, whereby the multiplexer function of the optical multiplexer/demultiplexer A is achieved. Further, a plurality of signal lightwaves are introduced through the corresponding output waveguides 6 and multiplexed, and the wavelength multiplexed lightwave is taken out from the single input waveguide 2, whereby the demultiplexer function is achieved.

Alternatively, the optical multiplexer/demultiplexer may have a plurality of input waveguides 2 and a single output waveguide 6 to achieve the multiplexer and demultiplexer functions.

Obviously, numerous modifications and variations of the present invention are possible in light of the above teachings. It is therefore to be understood that within the scope of the appended claims, the invention may be practiced otherwise than as specifically described herein.

What is claimed is:

1. An arrayed waveguide grating optical multiplexer/demultiplexer, comprising:
   an input-side slab waveguide having diffraction grating and waveguide end faces;
   an output-side slab waveguide having diffraction grating and waveguide end faces;
   an array waveguide grating including a plurality of channel waveguides connecting the diffraction grating end face of the input-side slab waveguide to the diffraction grating end face of the output-side slab waveguide;
   at least one input waveguide connected to the waveguide end face of the input-side slab waveguide; and
   at least one output waveguide connected to a waveguide end face of the output-side slab waveguide,
   wherein a focal length of the diffraction grating end face of the output-side slab waveguide is longer than a focal length of the waveguide end face of the input-side slab waveguide.

2. The multiplexer/demultiplexer according to claim 1, further comprising:
   two narrow-width waveguides disposed between each of said at least one input waveguide and said input-side slab waveguide so as to be apart from said at least one input a waveguide and said input-side slab waveguide,
   wherein said two narrow-width waveguides are arranged apart from each other in a direction perpendicular to an optical axis of said at least one input waveguide.

3. The multiplexer/demultiplexer according to claim 2, wherein an end portion of each of said at least one input waveguide facing the input-side slab waveguide comprises an inverted tapered shape having a width thereof gradually increasing towards its end, and
   wherein each side face of said end portion extends obliquely outward relative to the optical axis of said at least one input waveguide at a tapering angle in a direction of a width of said at least one input waveguide.

4. The multiplexer/demultiplexer according to claim 3, wherein each of said narrow-width waveguides obliquely extends relative to the optical axis of said at least one input waveguide at a same angle as the tapering angle.

5. The multiplexer/demultiplexer according to claim 4, wherein said input-side slab waveguide includes a wide-width waveguide portion disposed to face said two narrow-width waveguides, said wide-width waveguide portion comprising a trapezoidal shape in a plane view, and
   wherein each side face of said wide-width waveguide portion obliquely extends relative to the optical axis of said at least one input waveguide at a same angle as the tapering angle.

6. The multiplexer/demultiplexer according to claim 1, wherein each of said at least one output waveguide includes a tapered-shaped waveguide end portion having a width gradually decreasing in a direction away from the output-side slab waveguide.

7. The multiplexer/demultiplexer according to claim 1, wherein the diffraction grating end face of the input-side slab waveguide comprises a concave face having a center of curvature positioned at a central portion of the waveguide end face of the input-side slab waveguide, and
   wherein the diffraction grating end face of the output-side slab waveguide comprises a concave face having a center of curvature positioned at a central portion of the waveguide end face of the output-side slab waveguide.

8. The multiplexer/demultiplexer according to claim 7, wherein the waveguide end face of the input-side slab waveguide comprises a concave face having a center of curvature positioned at a middle point of a line connecting the center of the waveguide end face and the center of the diffraction grating end face of the input-side slab waveguide, and
   wherein the waveguide end face of the output-side slab waveguide comprises a concave face having a center of curvature positioned at a middle point of a line connecting the center of said waveguide end face and the center of said diffraction grating end face of the output-side slab waveguide.

9. An arrayed waveguide grating optical multiplexer/demultiplexer, comprising:
   an input-side slab waveguide having diffraction grating and waveguide end faces;
   an output-side slab waveguide having diffraction grating and waveguide end faces;
   means for connecting the diffraction grating end face of the input-side slab waveguide to the diffraction grating end face of the output-side slab waveguide;
   means for providing an input to the waveguide end face of the input-side slab waveguide;
   means for providing an output to a waveguide end face of the output-side slab waveguide; and
   means for providing a sufficiently flat wavelength dependent spectrum in passing channel spacings of the optical multiplexer/demultiplexer,
   wherein the means for providing a sufficiently flat wavelength dependent spectrum provides a focal length of the diffraction grating end face of the output-side slab waveguide longer than a focal length of the waveguide end face of the input-side slab waveguide.

10. A method of making an arrayed waveguide grating optical multiplexer/demultiplexer, comprising the steps of:
    forming an input-side slab waveguide having diffraction grating and waveguide end faces on a substrate;
    forming an output-side slab waveguide having diffraction grating and waveguide end faces on the substrate;
    connecting the diffraction grating end face of the input-side slab waveguide to the diffraction grating end face of the output-side slab waveguide via an array waveguide grating including a plurality of channel waveguides;
    connecting at least one input waveguide to the waveguide end face of the input-side slab waveguide; and
    connecting at least one output waveguide to a waveguide end face of the output-side slab waveguide,
    wherein a focal length of the diffraction grating end face of the output-side slab waveguide is longer than a focal length of the waveguide end face of the input-side slab waveguide.

11. The method according to claim 10, further comprising the steps of:
    disposing two narrow-width waveguides between each of said at least one input waveguide and said input-side slab waveguide so as to be apart from said at least one input waveguide and said input-side slab waveguide; and arranging the two narrow-width waveguides apart from each other in a direction perpendicular to an optical axis of said at least one input waveguide.

12. The method according to claim 11, wherein an end portion of each of said at least one input waveguide facing the input-side slab waveguide comprises an inverted tapered shape having a width thereof gradually increasing towards its end, and wherein each side face of said end portion extends obliquely outward relative to the optical axis of said at least one input waveguide at a tapering angle in a direction of a width of said at least one input waveguide.

13. The method according to claim 12, wherein each of said narrow-width waveguides obliquely extends relative to the optical axis of said at least one input waveguide at a same angle as the tapering angle.

14. The method according to claim 13, wherein said input-side slab waveguide includes a wide-width waveguide portion disposed to face said two narrow-width waveguides, said wide-width waveguide portion comprising a trapezoidal shape in a plane view, and wherein each side face of said wide-width waveguide portion obliquely extends relative to the optical axis of said at least one input waveguide at a same angle as the tapering angle.

15. The method according to claim 10, wherein each of said at least one output waveguide includes a tapered shaped slab waveguide end portion having a width gradually decreasing in a direction away from the output-side slab waveguide.

16. The method according to claim 10, wherein the diffraction grating end face of the input-side slab waveguide comprises a concave face having a center of curvature positioned at a central portion of the waveguide end face of the input-side slab waveguide, and wherein the diffraction grating end face of the output-side slab waveguide comprises a concave face having a center of curvature positioned at a central portion of the waveguide end face of the output-side slab waveguide.

17. The method according to claim 16, wherein the waveguide end face of the inputside stab waveguide comprises a concave face having a center of curvature positioned at a middle point of a line connecting the center of the waveguide end face and the center of the diffraction grating end face of the input-side slab waveguide, and wherein the waveguide end face of the output-side slab waveguide comprises a concave face having a center of curvature positioned at a middle point of a line connecting the center of said waveguide end face and the center of said diffraction grating end face of the output-side slab waveguide.

* * * * *